Patented Nov. 13, 1928.

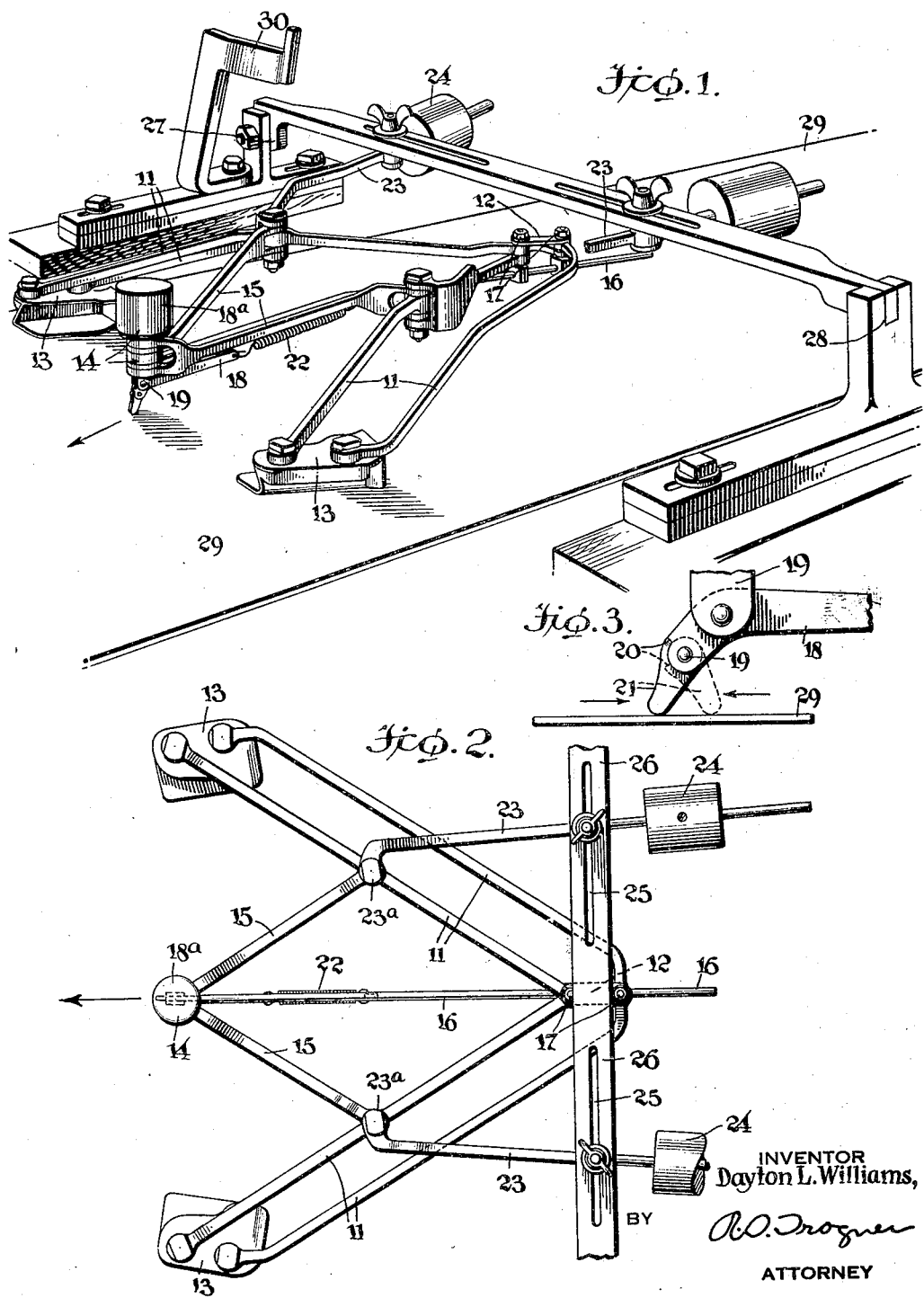

1,691,748

UNITED STATES PATENT OFFICE.

DAYTON L. WILLIAMS, OF AKRON, OHIO, ASSIGNOR TO THE GOODYEAR TIRE & RUBBER COMPANY, OF AKRON, OHIO, A CORPORATION OF OHIO.

MARKING DEVICE.

Application filed March 31, 1925. Serial No. 19,667.

My invention relates to a method of and apparatus for constructing tires and it has particular relation to that phase of tire construction which deals with the application of fabric to a suitable core to form a carcass.

One object of my invention is to provide a method of accurately centering the fabric on a tire core.

More specifically, however, the object of this invention is to provide a device for marking the center of a strip of rubberized fabric whereby the mark may be made to coincide with the greatest circumference of the core.

In constructing tires by the core method, a plurality of layers of fabric must be superimposed and shaped around a suitable mandrel. It is very important that the strips of fabric be accurately centered. First, because in case a strip does not surround the transverse periphery of the bead, the finished tire will have local weaknesses. Secondly, inasmuch as the rubberized fabric employed is quite expensive, it is important to cut widths which will just suffice.

In the past, tire builders have resorted to their skill alone in centering the various bands of fabric, and consequently a lack of skilled operators necessitated the provision of bands of a much greater width in order to avoid non-uniformity and defectiveness in the product.

According to my invention I mark the center of a ply at some time prior to its incorporation in the tire. This enables the workman to so adjust the rubberized fabric that the mark coincides with the greatest circumference of the core.

Referring to the drawings:

Fig. 1 is a perspective view, partly broken, of a device constructed in accordance with my invention;

Fig. 2 is a plan view thereof; and

Fig. 3 is a detail of a marking point of the device.

The mechanism includes a plurality of rods or levers 11 pivotally secured in spaced relation by means of a link 12 to form a structure of V shape. The free ends of the members 11 are pivotally joined to guide members 13, which are adapted to engage the edges of a sheet of fabric. A weighted marking means 14 is held in operative relation within the double V-formation by marker links 15 and a rod 16, that extends in slidable relation through pins 17 which unite the levers 11.

The marker includes a bell crank lever 18, pivoted at the base of a weight $18^a$, which is pivotally connected to the contiguous levers 11 by the links 15. At one end of the lever 18 a marking point 21 is loosely mounted and adapted to oscillate on a pin 19. The point is held in an operative position by an integrally formed shoulder 20, which engages the end of the lever 18 and limits forward movement of the point. The other end of the lever 18 is connected to the rod 16 by means of a spring 22, whereby the lever is resiliently maintained in an operative position.

The entire marking device is supported by a plurality of arms 23, pivotally connected to the levers 11, as indicated at $23^a$, and adjustably and pivotally secured to a supporting member 26. Counter-weights 24 are adjustably mounted upon the free ends of the arms 23. The arms 23 may be adjusted along slots 25 provided in the cross-member 26, to adapt the marking device for the reception of any width of fabric. The cross-member 26 is pivoted at one end 27 and rests in a slotted support 28 at the other. The marking unit may be raised and thereby removed from a conveyor belt 29 which carries the fabric material. A bracket 30 is adapted to swing into engagement with the raised cross-member in order to hold the marking mechanism in a removed position.

It is obvious that, as the fabric moves in the direction of the arrow shown in Fig. 2, the frictional contact made by the marker point 21 subjects the marker links 15 to a tension which urges the levers 11 inwardly. There is at all times an equilibrium of forces which, if disturbed, will immediately be reestablished by a readjustment of the linkage. Thus, if one of the guide members does not meet the edge of the fabric, the tension in the marker links will draw the arms inwardly until contact is made and an equal force set up which will oppose that of the marker. On the other hand, if the width of the fabric should increase, the force against the guides 13 will be sufficient to overcome that created by the movement of the sheet and the arms will move outwardly to effect a static equilibrium.

In order to make the device more flexible, the marker point is pivoted. This construction is especially advantageous, when the sheet must be moved in opposite directions. Thus, in case the strip must be drawn backward, the slightly inclined marker point will not penetrate the sheet inasmuch as it is rendered inoperative by the initial backward movement. This refinement in the marker construction is optional and it is unnecessary when only one direction of motion need be considered.

The weight above the marker point should have sufficient mass to give a permanent imprint on the material. On the other hand, the counterweight means 24 should be so adjusted that the guide members will not lay heavily on the moving strip, but will respond even to a slight unbalanced force. This regulation is a direct measure of the sensitiveness and accuracy of the marker.

While I have described this mechanism with a special reference to its adaptation to rubberized fabric, it will be realized that it may be employed with other sheet materials. I desire, therefore, that only such limitations shall be imposed as are consistent with prior art and the appended claims.

What I claim is:

1. A device for marking sheet material comprising means for marking the material and means actuated by the marking means during movement of the material for automatically centering the marking means upon the material.

2. A device for marking sheet material comprising a plurality of pivotally supported levers, means for guiding sheet material pivotally secured to the levers, and a marker flexibly connected to the levers to function in cooperation with the guide means.

3. A device for marking sheet material comprising a plurality of pivotally supported levers, means for guiding sheet material pivotally secured to the levers, a marker flexibly connected to the levers and means for adjustably supporting the marker in a central position.

4. A device for marking sheet material comprising a supporting member, counterbalanced arms adjustably secured thereto a pair of levers pivotally secured to the arms and to a pair of guides, a second pair of levers flexibly connected to the first pair and pivotally connected to the guides, a marker flexibly connected to the first pair of levers by a plurality of links and a rod connected to the marker to maintain it in a centrally aligned position.

5. A device for marking sheet material comprising a support, a plurality of members adjustably secured to the support, a plurality of levers having pivotal connection with the members, guides carried by the levers adapted to engage the edges of the material, and a marker element having pivotal connection with the members and the guides.

6. A device for marking sheet material comprising a supporting member, a pair of pivotally connected levers, sheet engaging guide elements carried by the free ends of the levers, a marker, means pivotally connecting the marker to intermediate points on the respective levers and supporting arms pivotally connected to the supporting member and to the levers at said intermediate points.

7. A device for marking a moving web of material comprising a supporting member disposed above the web, a pair of pivotally connected levers, means pivotally connecting the levers to the supporting member, guide elements carried by the levers for engagement with the web, a marker, and means pivotally connecting the marker to the levers.

8. A device for marking sheet material, including a support, a plurality of pivotally connected levers constituting a frame of parallelogrammatic shape, a pair of supporting arms pivotally connected to the support and to opposite corners of the frame and a marker element mounted at one of the remaining corners of the frame.

9. A device for marking sheet material including a support, a plurality of pivotally connected levers constituting a frame of parallelogrammatic shape, a pair of supporting arms pivotally connected to the support and to opposite corners of the frame, a marker element mounted at one of the remaining corners of the frame, certain of the levers extending past the point of pivotal connection thereto of adjacent levers, and guide elements pivotally connected to the extended portions of the levers.

10. A device for centrally marking a traveling web of material comprising a supporting member disposed above the web, a pair of pivotally connected levers, means pivotally connecting the levers to the supporting member, guide elements carried by the free ends of the levers for engagement with the edges of the web, a marker and means pivotally connecting the marker to the levers whereby movement of the marker in the direction of travel of the web serves to retain the guide elements in contact with the web.

In witness whereof, I have hereunto signed my name.

DAYTON L. WILLIAMS.